(12) United States Patent
de Silva et al.

(10) Patent No.: US 7,565,239 B2
(45) Date of Patent: Jul. 21, 2009

(54) METHOD AND APPARATUS FOR NAVIGATION SYSTEM FOR SEARCHING SELECTED TYPE OF INFORMATION ALONG ROUTE TO DESTINATION

(75) Inventors: Andrew S. de Silva, Torrance, CA (US); Hikaru Wako, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 475 days.

(21) Appl. No.: 11/124,043

(22) Filed: May 6, 2005

(65) Prior Publication Data
US 2006/0253247 A1    Nov. 9, 2006

(51) Int. Cl.
G01C 21/26 (2006.01)
(52) U.S. Cl. .................. 701/201; 701/200; 340/995.27
(58) Field of Classification Search ......... 701/200–202, 701/208–209, 211; 340/988, 995.1, 995.27
See application file for complete search history.

(56) References Cited

U.S. PATENT DOCUMENTS

| | | | |
|---|---|---|---|
| 6,009,403 A | 12/1999 | Sato | |
| 6,169,956 B1 * | 1/2001 | Morimoto et al. | 701/209 |
| 6,401,034 B1 * | 6/2002 | Kaplan et al. | 701/209 |
| 6,829,533 B2 * | 12/2004 | Shitamatsu et al. | 701/211 |
| 7,089,264 B1 * | 8/2006 | Guido et al. | 707/104.1 |

* cited by examiner

Primary Examiner—Yonel Beaulieu
(74) Attorney, Agent, or Firm—Muramatsu & Associates

(57) ABSTRACT

A method and apparatus for use with a navigation system to search specified type of information along a calculated route to a destination by incorporating search criteria based on city or other regional zones. The method includes the steps of building one or more zones to be traversed in travelling on the calculated route to the destination based on map data, displaying a list of zones on the calculated route to prompt a user to select a zone, displaying a list of types of information to prompt the user to select a type of information to be searched, searching information along the calculated route within the selected zone within a predetermined search range of the calculated route, and displaying the information of the selected type within the selected zone resulted from the search.

20 Claims, 15 Drawing Sheets

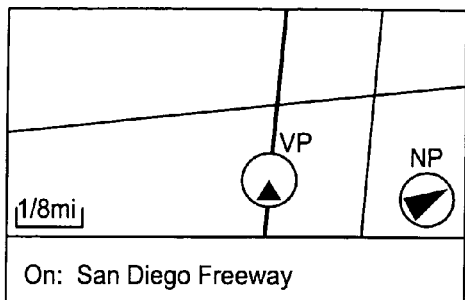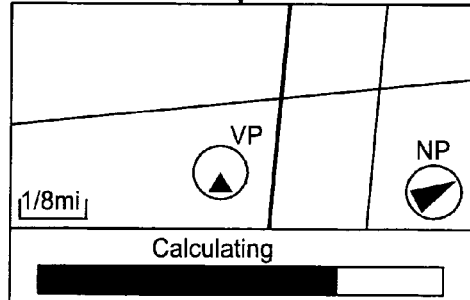

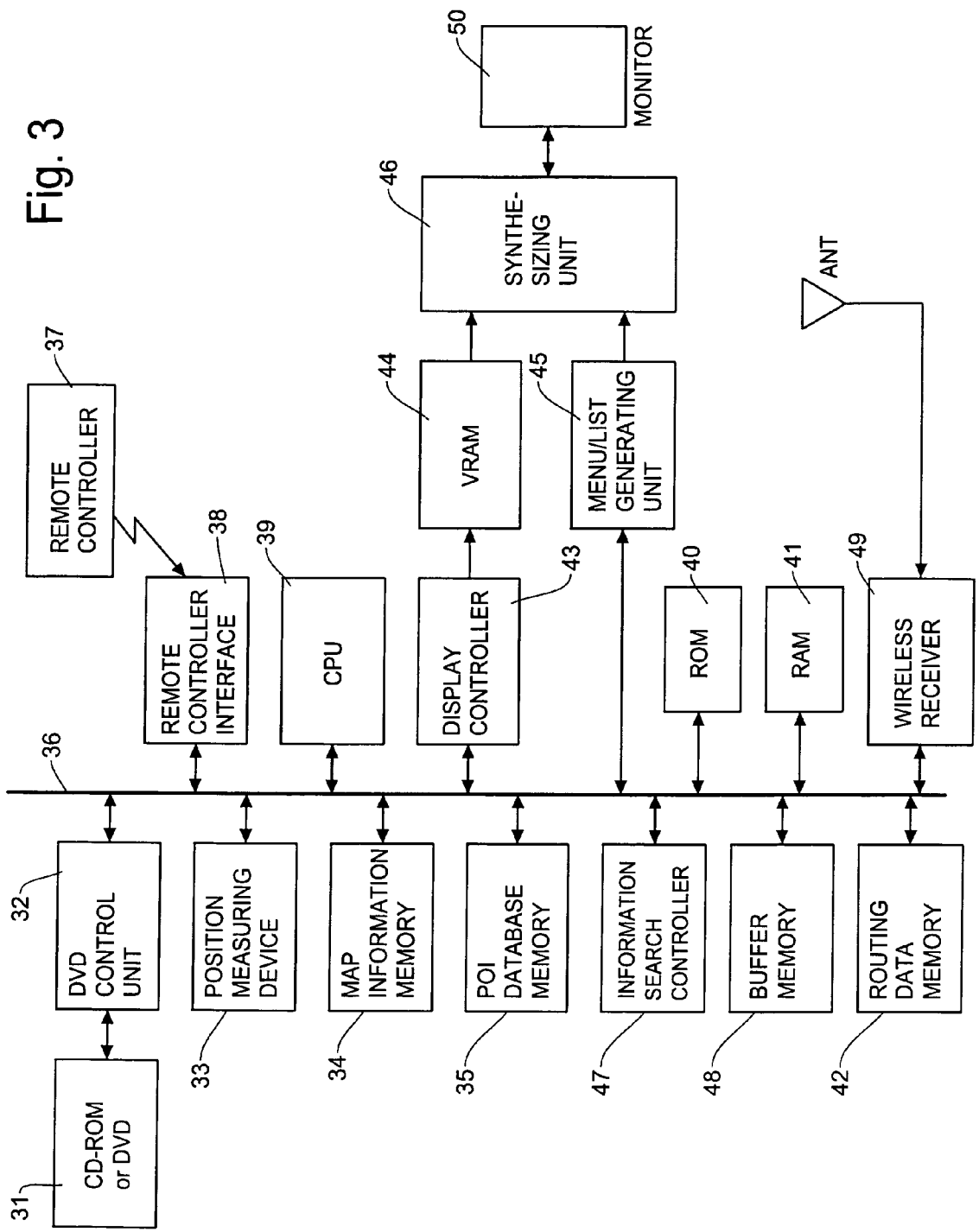

Fig. 7D

| Traffic Incident List | View Detail |
|---|---|
| Avoid All Incidents | Avoid Selected Incidents |
| 🚗 Traffic Jam, I-215N | |
| 🚸 Railway Crossing, Main St. | |
| ⛏ Construction, 1st Ave. | |
| 🚛 Stalled vehicle, Barstow Dr. | |

Fig. 7E

| Traffic Incident List | View Detail |
|---|---|
| Avoid All Incidents | Avoid Selected Incidents |
| 🚗 Traffic Jam, I-215N | |
| 🚸 Railway Crossing, Main St. | |
| ⛏ Construction, 1st Ave. | |
| 🚛 Stalled vehicle, Barstow Dr. | |

Fig. 7F

| Traffic Incident List | View Detail |
|---|---|
| Avoid All Incidents | Avoid Selected Incidents |

Recalculating Route....Please Wait

METHOD AND APPARATUS FOR NAVIGATION SYSTEM FOR SEARCHING SELECTED TYPE OF INFORMATION ALONG ROUTE TO DESTINATION

FIELD OF THE INVENTION

This invention relates to a method and apparatus for searching specified type of information by a navigation system, and more particularly, to an information search method and apparatus for a navigation system that can retrieve information of selected types along the route to the destination with improved flexibility and usability by incorporating search criteria based on city or other regional boundaries.

BACKGROUND OF THE INVENTION

A navigation system performs travel guidance for enabling a user to easily and quickly reach the selected destination. A typical example is a vehicle navigation system where a user drives a car by the guidance produced by a navigation system. Such a navigation system detects the position of the user or user's vehicle, reads out map data pertaining to an area at the current vehicle position from a data storage medium. Alternatively, such map data can be provided to the user from a remote server through a communication network such as Internet.

When a destination is set, the navigation system starts a route guidance function for guiding a user along a calculated route from the start point to the destination. During the route guidance, the navigation system reads the nodes data from the data storage medium such as DVD and successively stores the nodes data of road segments constituting the guided route in a memory. In the actual traveling, the node series stored in the memory is searched for a portion of the guided route to be displayed in a map display area of the monitor screen, and the portion of the guided route is highlighted so as to be clearly discernible from other routes. When the vehicle is within a predetermined distance from an intersection it is approaching, a highlighted intersection diagram with an arrow indicating the direction to turn at the intersection is displayed to inform the user of the appropriate road and direction at the intersection.

FIGS. 1A-1H show an example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. When selecting a "Destination" menu on a main menu screen (not shown), the navigation system displays an "Find Destination By" screen as shown in FIG. 1B for specifying an input method for selecting the destination.

The "Find Destination By" screen of FIG. 1B lists various methods for selecting the destination. The methods include "Address" for specifying the city and address of the destination, "Intersection" for specifying the names of two streets which intersect with one another, and "Point of Interest (POI)" for selecting the programmed destination based on the name, category or telephone number. Other methods in the "Find Destination By" screen include "Recent Route" for specifying the destination based on the recent history of destinations saved in the system, "Address Book" for selecting the address of the destination out of the prescribed address list stored in the system, and "Today's Plan" for selecting two or more destinations.

When selecting, for example, the "Point of Interest (POI)" method, the navigation system displays selection methods of point of interest (POI) either by "Place Name" or "Place Type" in FIG. 1C. The "Place Name" is to specify a name of POI, and the "Place Type" is to specify a category or type of POIs. Suppose the "Place Type" is selected, the navigation system shows an "Select Category" screen such as shown in FIG. 1D.

Suppose the user selects "Restaurant", the navigation system retrieves the POIs in the selected category, restaurant, as shown in FIG. 1E. Typically, names of POIs (restaurants) will be listed in the order of distance from the user (ex. current vehicle position). If the user selects a particular restaurant from the list, the navigation system displays a "Confirm Route" screen such as shown in FIG. 1F. In this example, the "Confirm Route" screen lists the name, address and phone number of the destination (POI specified by the user). If this is the correct destination, the user enters an "OK to Proceed" key to proceed to the next procedure.

In FIG. 1G, the navigation system calculates and determines a route to the destination, i.e., the selected POI. The navigation system determines a route to the destination based on, for example, the shortest way to reach the destination, the route using many free ways as possible or the route without using toll road, and the like. Then, the navigation system starts the route guidance as shown in FIG. 1H to guide the user along the calculated route to the destination. Typically, the navigation system shows the intersection which is highlighted to show the next turn and a direction of the turn. Such route guidance by the navigation system is also accompanied by voice instructions.

The foregoing is a typical example of using the "Point of Interest (POI)" input method of the navigation system for selecting a destination. Because the recent storage medium provides a large volume of POI data, this input method can be used in various applications. For example, suppose a user is driving a car for a relatively long trip through a calculated route to the destination, and the user wants to stop-by various places such as a gas station, restaurant, shopping mall, etc., along the route. Alternatively, the user may simply want to enjoy seeing various places along the calculated route to the destination.

Accordingly, a POI search method is proposed so that it lists points of interest that a user will encounter in following the calculated route to the destination. In this method, generally, the navigation system will detect POIs along the route by determining if POIs exist within a certain range of the calculated route. Such a situation is shown in the diagram of FIG. 2. The navigation system checks if a POI exists within a search range 16 along the calculated route 12. The search range 16 is created, for example, by incrementally shifting a search circle 15 of a predetermined diameter on the calculated route 12. Among several POIs 23a-23e, the navigation system will retrieve a POI 23b as it falls within the search range 16.

The navigation system generally lists detected POIs along the route in the order that the user will encounter them in following the calculated route, i.e., in an order of distance from the current user (vehicle) position. When the destination is located far away from the current vehicle position, POI information necessary for the user could not be detected by the navigation system. This drawback mainly stems from the decrease of performance due to the scope of search required to find all POIs along the route. For example, if the navigation system has to search all of POIs along the route to the destination which is over, for example, 200 miles away from the current position, it takes a long time to detect all of the POIs even by using a most advanced processor. Therefore, the navigation system usually has to limit the range of search to several ten miles from the current vehicle position.

In such a situation, the user is unable to fully utilize POI data since the user cannot see POIs located over 200 miles range. This poses difficulty in planning a stopover en route to a destination. For instance, the user may depart to a destination in the morning and want to decide where to take lunch in advance. In some cases, the user wants to make a stopover in a particular city for a particular event during the trip. The user may know that the vehicle will pass through countryside rich in nature, and wants to take a dinner in that region. Accordingly, there is a need for a navigation system that is capable of searching for POI information or other types of information even when they are located far away from the present vehicle location.

SUMMARY OF THE INVENTION

It is, therefore, an object of the present invention to provide a method and apparatus for navigation system that can detect and provide information such as points of interest (POIs) along a calculated route to a destination for a selected zone such as a neighborhood city or a state.

It is another object of the present invention to provide a method and apparatus for navigation system that can retrieve and display selected type of information including POIs, traffic incidents, weather, local events, etc., within a selected area such a city along a calculated route to a destination It is a further object of the present invention to provide a method and apparatus for navigation system that allows the user to select type of information to be retrieved along a route to the destination to select a city name within which the information is retrieved.

One aspect of the present invention is a method of finding information along a calculated route by a navigation system. The method includes the steps of building one or more zones to be traversed in travelling on the calculated route to the destination based on map data and routing data, displaying a list of zones on the calculated route to prompt a user to select a zone, displaying a list of types of information to prompt the user to select a type of information to be searched, searching information along the calculated route within the selected zone within a predetermined search range of the calculated route, and displaying the information of the selected type within the selected zone resulted from the search. The zone is a city, county or state through which the calculated route runs.

In one example, the information is points of interest (POI) information along the calculated route, and the method further comprises a step of displaying a list of types of POI information to prompt the user to select a type of POIs to be searched. When the information is POI information along the calculated route, the method further comprises a step of setting a selected POI as a stopover so that the navigation system guides the user to the selected POI.

In another example, the information is local event information along the calculated route, and the method further comprises a step of displaying a list of types of local event information to prompt the user to select a type of local events to be searched. When the information is local event information along the calculated route, the method further comprises a step of setting a place of selected local event as a stopover so that the navigation system guides the user to the selected local event, and a step of displaying detailed information on a selected local event and allowing the user to make a reservation or purchase a ticket for the selected local event.

In a further example, the information is traffic incident information along the calculated route, and the method further comprises a step of displaying a list of traffic incidents with corresponding traffic icons. When the information is traffic incident information along the calculated route, the method further comprises a step of specifying all or selected traffic incidents to avoid from the calculated route to the destination, and a step of recalculating a route to the destination to produce a new route which avoids all or the selected traffic incidents therefrom.

Another aspect of the present invention is an apparatus for finding information along the calculated route to the destination. The apparatus is comprised of various means for implementing the steps of the method of the present invention noted above.

According to the present invention, the method and apparatus enables to search POIs or other types of information along the route to the destination within a selected region such as a city. The user can plan ahead to decide a stopover location even when such a location is far away at present. Accordingly, the flexibility and usability of the navigation system are greatly increased by enhancing the ability in which the search along the route method is used. The selected types of information includes POIs, traffic incidents, weather, local events, local news, etc. and is related to a selected area such as a city along the calculated route to a destination.

BRIEF DESCRIPTION OF THE DRAWINGS

FIGS. 1A-1H are schematic diagrams showing an example of operational process and screen display of a navigation system in the conventional technology.

FIG. 3 is a block diagram showing an example of structure of a vehicle navigation system for implementing the present invention for searching selected type of information along the route to the destination.

FIG. 4A shows the relationship among a current position, destination, route to the destination, and POIs located along the route, FIG. 4B shows city boundaries and a search range added to FIG. 4A, and FIG. 4C shows icons of local events, traffic incidents, and weather in addition to the elements shown in FIG. 4B.

FIG. 5A shows a list of menus including "Find POI Along Route", FIG. 5B shows a list of POI types, FIGS. 5C-5D show lists of cities along the route, FIG. 5E shows a list of POI types when a city is specified, FIG. 5F shows a screen during the search process, FIG. 5G shows a list of POIs of selected type within the selected city, FIG. 5H shows detailed information of a selected POI, and FIG. 5F shows a display to notify that a POI of selected type is not found.

FIG. 6A shows a list of menus including "City Along Route", FIG. 6B shows a list of cities along the route, FIG. 6C shows a list of information types, FIG. 6D shows a list of local event types, FIG. 6E shows a list of events of selected type within the selected city, and FIG. 6F shows detailed information of a selected event.

FIGS. 7A-7F are display examples showing the steps of searching and displaying traffic incidents along the route in the present invention to search relevant traffic incidents within the selected city. FIG. 7A shows a list of types of information, FIG. 7B shows a list of traffic incidents along the route within a specified city, FIG. 7C shows an example of detailed information on selected traffic incident, FIGS. 7D and 7E show methods of avoiding traffic incidents, FIG. 7F shows a case where a new route is calculated for avoiding traffic incidents.

DETAILED DESCRIPTION OF THE INVENTION

Figure 2:
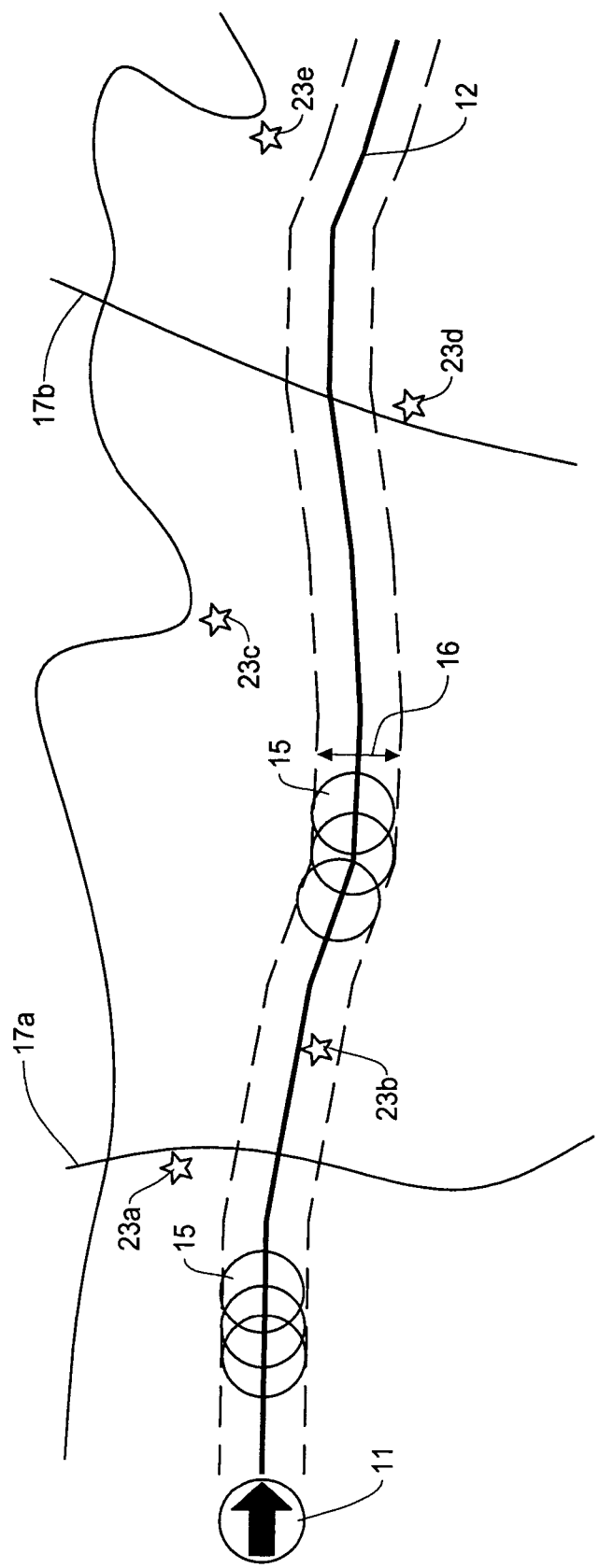
FIG. 2 is a schematic diagram showing an example of a situation where several points of interest are located along a calculated route to the destination where the conventional method is applied thereto for finding points of interest along the calculated route.

The present invention will be described in detail with reference to the accompanying drawings. The method and apparatus is used for a navigation system and is designed to search and display information on points of interest (POI), local events, traffic incidents, weather, local news, etc., along a route. The user can select a zone, such as a city, county or state, to search selected types of information in the selected zone within a search range.

FIG. 3 shows an example of structure of a vehicle navigation system implementing the present invention. It should be noted that the present invention can also be applied to portable navigation devices such as a PDA (personal digital assistant) device, a lap-top computer, or other hand-held devices.

In the block diagram of FIG. 3, the navigation system includes a map storage medium 31 such as a CD-ROM, DVD, hard disc or other storage means (hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 3 further includes a map information (data) memory 34 for storing the map information which is read out from the DVD 31, a database memory 35 for storing database information such as point of interest (POI) information which is read out from the DVD 31, a remote controller 37 for executing a menu selection operation, an enlarge/reduce operation, a destination input operation, etc., and a remote controller interface 38.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guided (calculated) route, a display controller 43 for generating a map image (a map guide image and an arrow guide image) on the basis of the map information, a VRAM (Video RAM) 44 for storing images generated by the display controller, a menu/list generating unit 45 for generating menu image/various list images, a synthesizing unit 46, a routing data memory 42, an information search controller 47, a buffer memory 48, a wireless receiver 49, and a monitor (display) 50.

The information search controller 47 directly relates to the present invention. The information search controller 47 has a function of controlling an overall procedure for searching POIs or other type of information along a calculated route to the destination and displaying such information in a requested manner. Based on the destination specified by the user and the calculated route to the destination, the information search controller 47 causes to create a list of regional zones such as cities along the calculated route. In the case where the user has visited the same destination before, the navigation system stores the routing data to such previous destinations in the routing data memory 42 so that the information regarding the route to the destination can be retrieved from the routing data memory 42 rather than from the map storage medium (DVD) 31. When the user selects the type of information along the route to the destination, the information search controller 47 causes to search specified type of information along the route within a selected city, county or other area.

Typically, POI information can be retrieved from the POI database memory 35 which further retrieves the POI information from the main storage (DVD) 31. When the user selects the search method for searching other information, such as traffic incidents, local events, weather, local news, unique facilities, etc., the information search controller 47 causes to search selected information along the route within a selected zone. Typically, such information can be retrieved from service providers through wireless communications by the wireless receiver 49 and antenna in FIG. 3. The wireless communication includes satellite radio, wireless Internet, etc. The received information can be temporarily stored in the buffer memory 48 for data retrieval and processing by the information search controller 47.

Figure 4A:
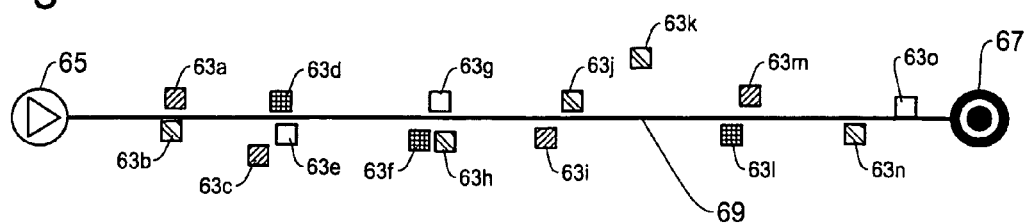
FIGS. 4A-4C are schematic diagrams showing the concept of POI search along the route in the present invention where
Figure 4B:
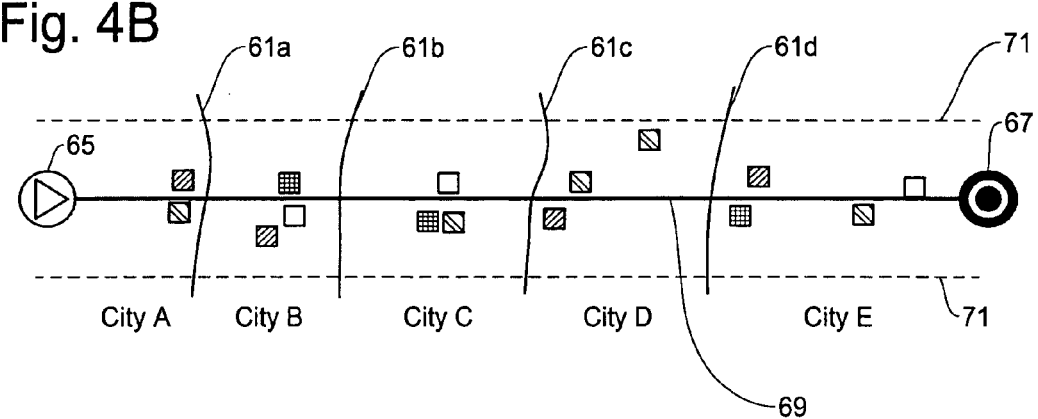
Figure 4C:
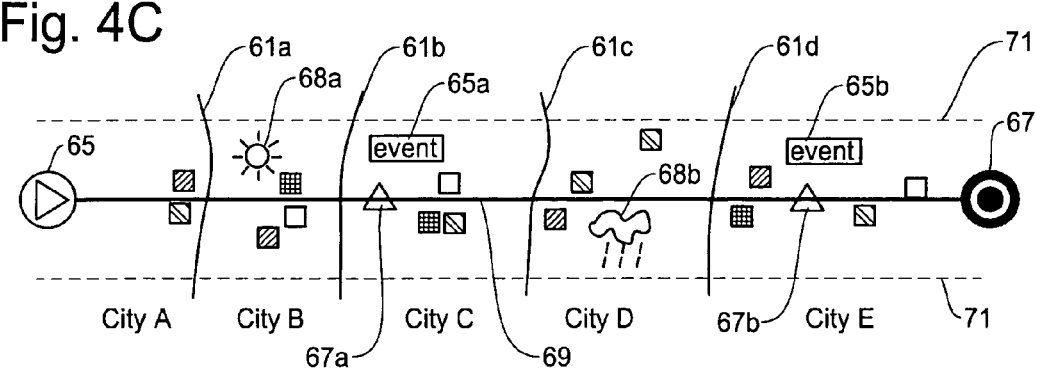

FIGS. 4A-4C are schematic diagrams showing the concept of POI search of the present invention for searching POI information along the route within a specified city. FIG. 4A shows the relationship among a current position, destination, route to the destination, and the POIs located along the route, FIG. 4B shows city boundaries and a search range added to FIG. 4A, and FIG. 4C shows local events, traffic incidents and weather information in addition to the POIs and other elements shown in FIG. 4B. For simplicity of illustration, the reference numerals of the POIs in FIG. 4A are omitted in FIGS. 4B and 4C.

As shown in FIG. 4A, a current vehicle position 65 is illustrated on a calculated route 69 to the destination 67. For simplicity and ease of explanation, the calculated route 69 is illustrated by a simple straight line. There are a plurality of POIs 63a-63o along the route 69 that are represented by the box figures. The POIs of identical categories are denoted by the same patterns in the box figures of FIG. 4A.

FIG. 4B additionally shows a search range (search corridor) which are denoted by lines 71 on both sides of the route 69. Typically, a search range is defined by a search circle as shown in FIG. 2 which has a diameter of, for example, 0.4-3.0 miles that can be selected by the user. If POIs fall within the search range, the navigation system will recognize them as relevant POIs along the route that are accessible en route to the destination. FIG. 4B further shows separate zones, typically defined by city names A-E and city boundary lines 61*a*-61*d* along the route 69 to the destination 67. Such city names A-E and city boundary lines 61*a*-61*d* can be obtained from the map data retrieved from the map storage such as DVD 31 in FIG. 3. The vehicle 65 will cross the city (zone) borders during the trip to the destination 67 when the route to the destination is very long and traverses these cities.

FIG. 4C shows a situation where other information such as traffic incidents, local events, etc., can also be detected in the present invention. In this example, traffic incidents 67*a* and 67*b* exist in the cities C and E, respectively. A local event 65*a* exists in the city C, and a local event 65*b* exists in the city E. Weather icons 68*a* and 68*b* showing the weather conditions in the cities B and D are also illustrated. Typically, such information will be provided by service providers through wireless communication such as satellite radio, FM radio network, or the like. Other information such as local news, emergency notice, etc., may also be retrieved.

Figure 5A:
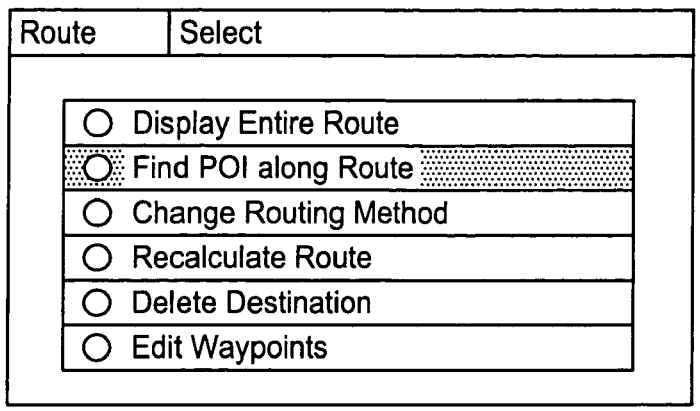
FIGS. 5A-5I are display examples showing the process of POI search along the route in the present invention where the user selects a city to list relevant POIs within the selected city.

FIGS. 5A-5I are display examples showing the steps of POI search along the route in the present invention wherein the user selects a city to search relevant POIs within the selected city. FIG. 5A shows an example of list of menus which will be displayed after specifying a destination in the navigation system. The list includes a "Find POI Along Route" menu associated with the present invention, although other type of menu such as "City Along Route" shown in FIG. 6A is also possible.

Figure 5B:
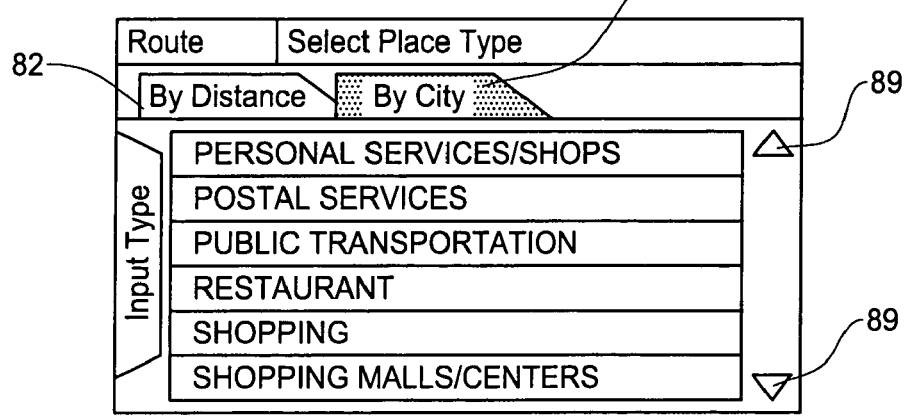
Figure 6A:
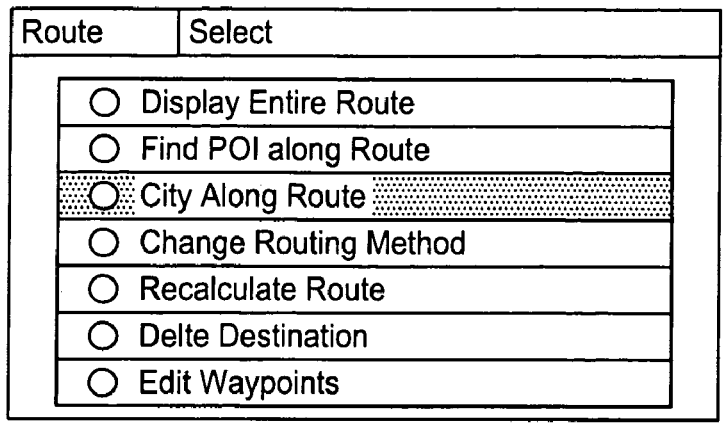
FIGS. 6A-6F are display examples showing the steps of searching and displaying local events along the route in the present invention to search local events within a selected city.

When selecting the "Find POI Along Route" menu in FIG. 5A, the navigation system shows a list of POI types for the user to select one of them as shown in FIG. 5B. The example of FIG. 5B also includes keys 81 and 82 to select either "By Distance" or "By City" for listing detected POIs. The "By Distance" key 82 is to list the POIs along the route in the order of distance from the current vehicle position. The "By City" key 81 is to list the POIs along the route within a specified city, which is directly associated with the present invention. The display example of FIG. 5B also includes scroll keys 89 for scrolling the list in upper and lower directions.

Figure 5C:
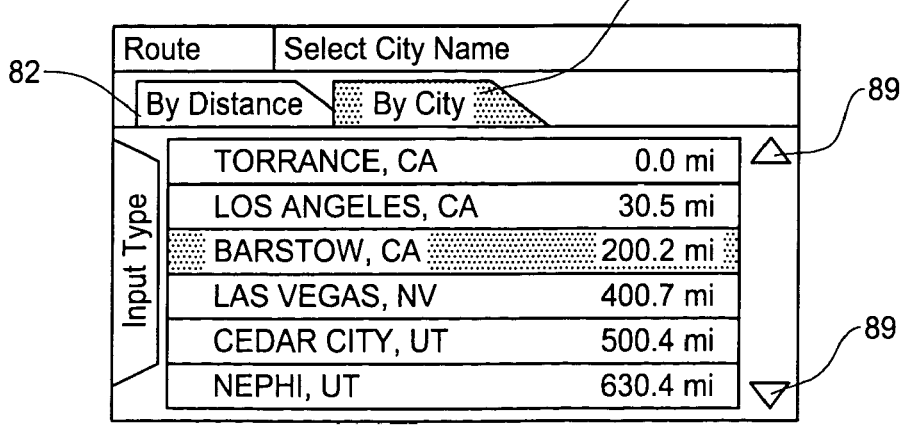
Figure 5D:
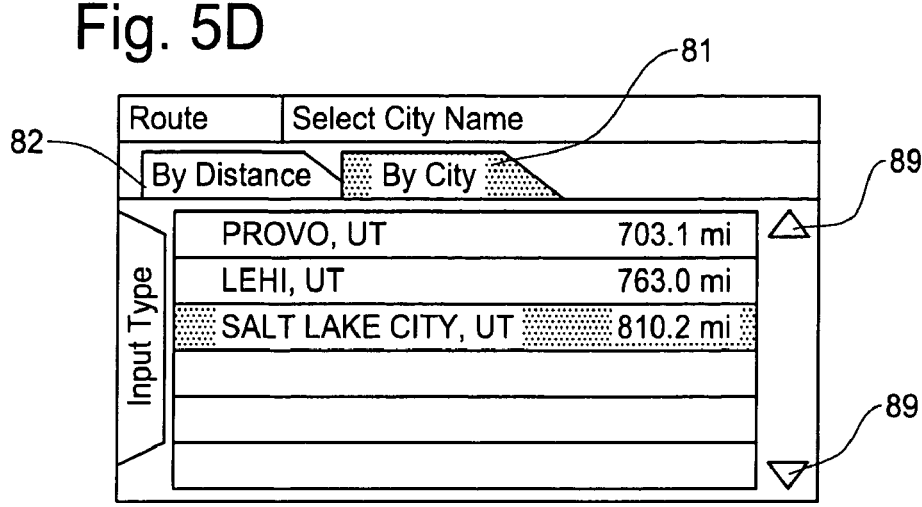

Suppose the user selects the "By City" key 81 in FIG. 5B, the navigation system will display a list of city names along the route to the destination as shown in FIGS. 5C-5D. The order of FIG. 5B for listing the types of POIs and FIGS. 5C-5*d* for listing the city names can be interchangeable, i.e., the user can select the city name before selecting the POI type. In FIGS. 5C and 5D, typically, the city names will be listed in the order of distance from the current vehicle position. When the user is interested in a particular city, "Barstow", he selects this city for searching for POIs within the city.

Figure 5E:
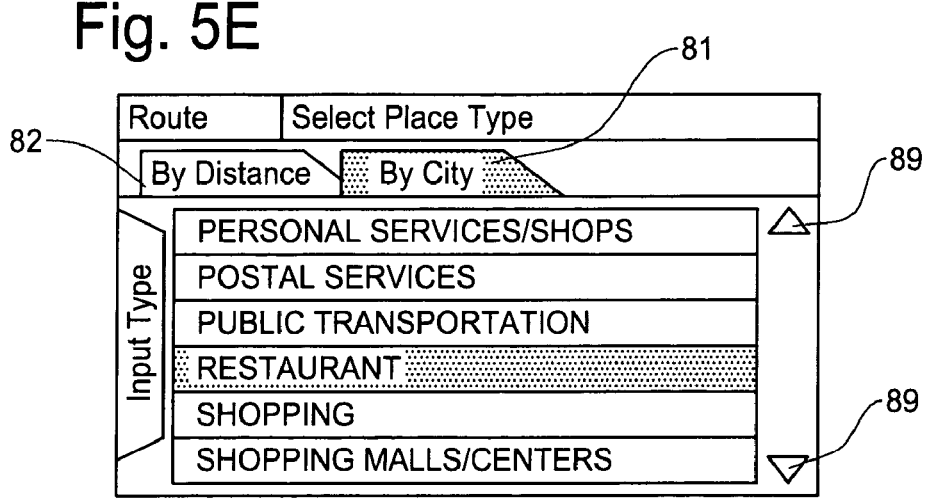
Figure 5F:
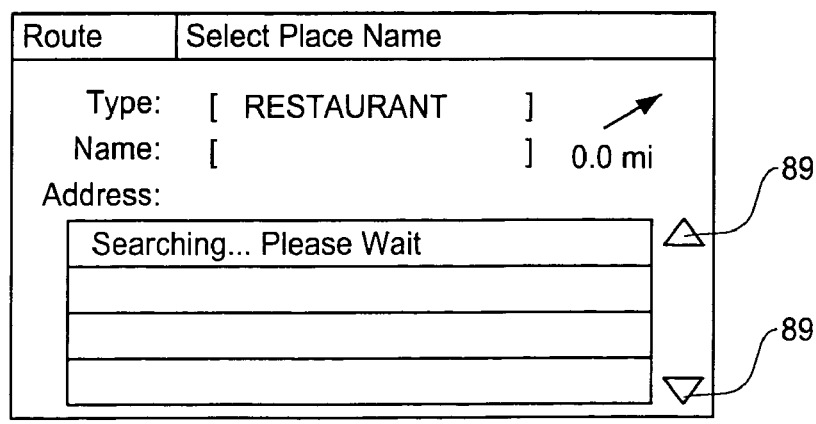

In this example, since the user did not specify the type of POIs in FIG. 5B, the navigation system will display a list of POI types again as shown in FIG. 5E to prompt the user to select one of them. In the case where the user has already selected the POI type in FIG. 5B, the process directly moves from FIG. 5C to FIG. 5F to search the POIs. Suppose the user selects "Restaurant" in FIG. 5E, the navigation system will search restaurants within the selected city "Barstow" as shown in FIG. 5F within a search range (search corridor or search width of FIGS. 4B-4C).

Figure 5G:
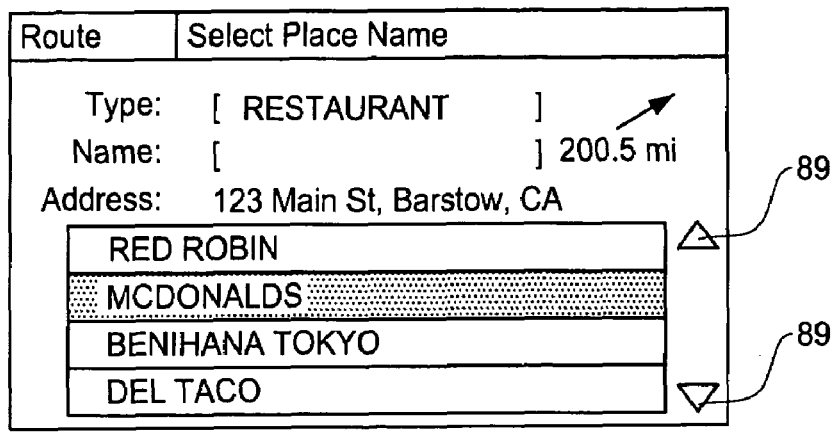
Figure 5H:
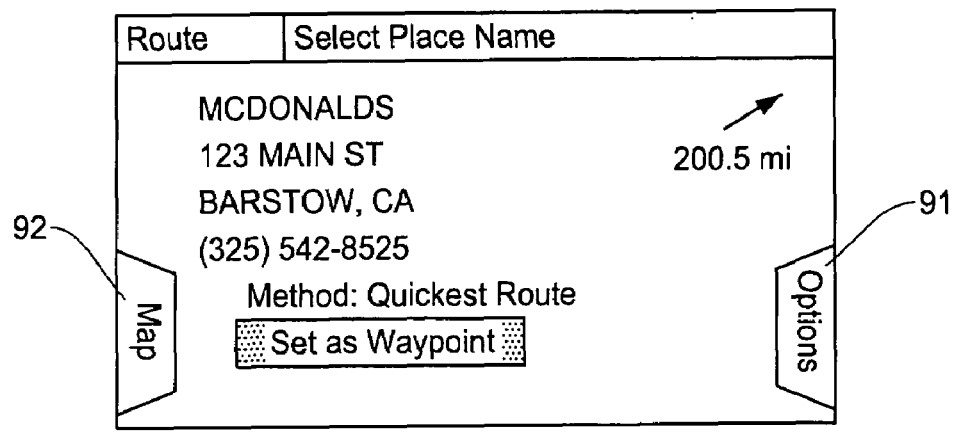
Figure 5I:
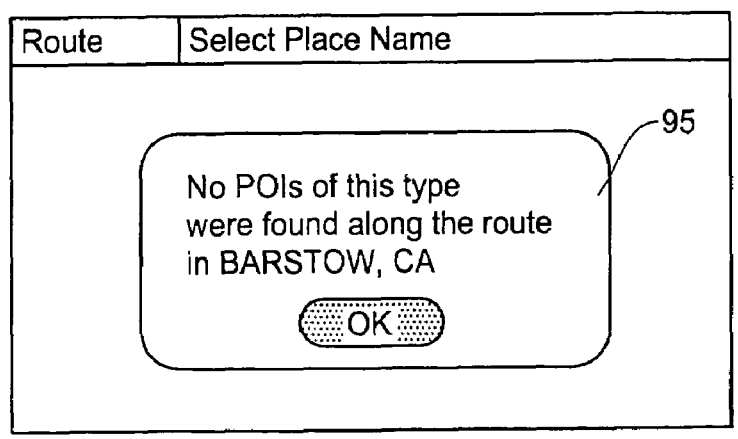

Then, in FIG. 5G, the navigation system will display a list of POIs (restaurants) along the route within the specified city "Barstow". When the user selects one of the POIs in FIG. 5G, the navigation system will show detailed information of the selected POI "McDonalds" as shown in FIG. 5H. If the user wants to stopover this particular POI, he presses a "Set as Waypoint" key, then the navigation system will calculate a route and guide the user to "Mcdonalds" as a tentative destination. In the case where POI of selected type is not found in the specified city along the calculated route, the navigation system will so notify in a manner as shown in FIG. 5I.

In the example described above, the navigation system only has searched for POIs for a selected city. However, it is also possible to search other types of information, such as traffic incidents, local events, local news, and weather forecast, etc. Such information may be obtained by means of wireless Internet, FM radio, or satellite radio, etc. FIGS. 6A-6F are display examples showing the process of searching and displaying local events along the route in the present invention wherein the user selects a city to list relevant local events within the selected city.

FIG. 6A shows a list of menus for implementing the present invention which typically appears after specifying a destination in the navigation system. The list includes a "City Along Route" menu for searching information on POIs, local events, traffic incidents, weather forecast, local news, etc., within a specified city, county, state, i.e., regional zone, along the calculated route to the destination in accordance with the present invention. In FIG. 6A, the user selects the "City Along Route" menu for obtaining information on the local events.

Figure 6B:
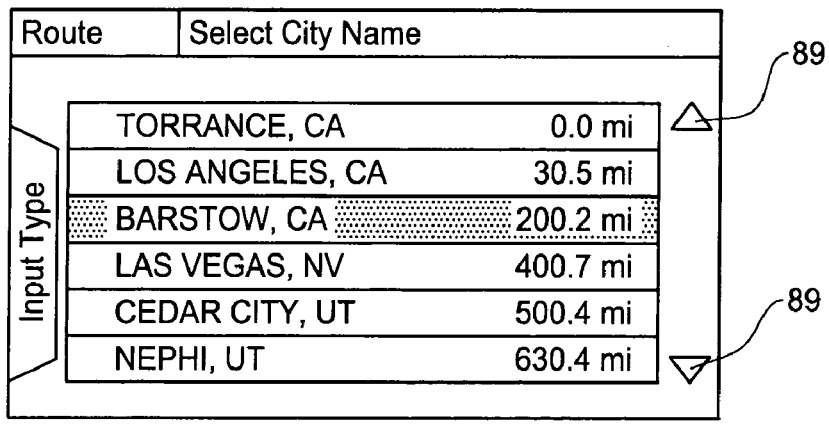

Then, as shown in FIG. 6B, the navigation system shows a list of cities along the route to the destination for the user to select one of them. Typically, the city names are arranged in the order of distance from the current vehicle position where the list includes a value of actual distance to each city. The display example of FIG. 6B also includes scroll keys 89 for scrolling the list of city names in upper and lower directions.

Figure 6C:
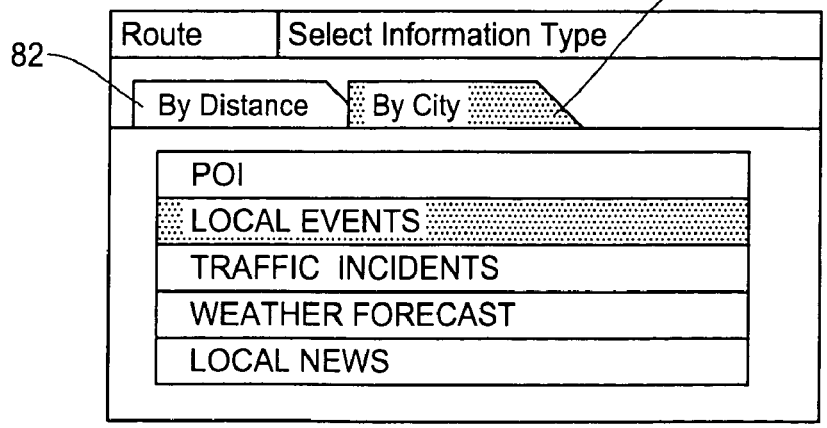

When the user selects a particular city, "Barstow" for example, in FIG. 6B, the navigation system displays a list of information types as shown in FIG. 6C for the user to select one of them. In this example, the list includes "POI", "Local Events", "Traffic Incidents", "Weather Forecast", and "Local News" although various other types and combinations will be also possible. If the user selects "POI", the navigation system moves to the POI search process by listing the type of POIs as shown in FIG. 5E. As noted above, the POI information can be retrieved from the map data storage (DVD 31) of the navigation system, whereas the other information, local events, traffic incidents, etc., usually has to be retrieved from databases of service providers through wireless communication such as wireless Internet, or satellite radio, etc.

Figure 6D:
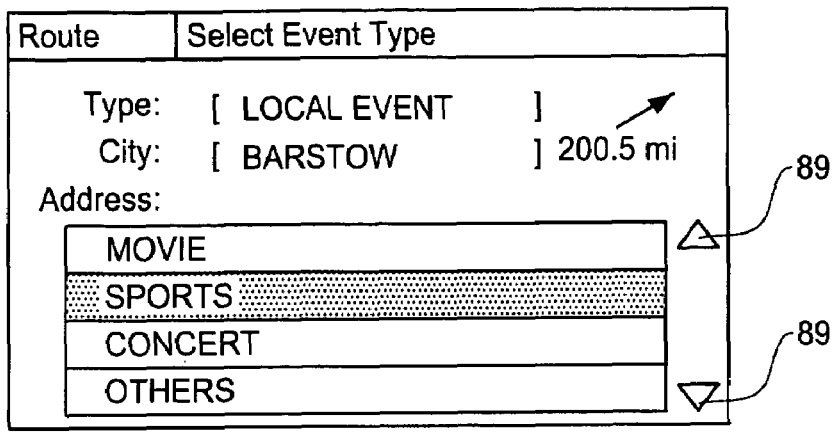

The display example of FIG. 6C further includes a "By City" key 81 and a "By Distance" key 82. The "By City" key 81 allows the user to change the city by going back to the display example of FIG. 6B. The "By Distance" key 82 is to search and list the local events along the route in the order of distance from the current user position without limiting to a particular city. The user selects the "Local Events" in FIG. 6C to retrieve the information on the local events in the selected city "Barstow" along the route to the destination. The navigation system will display a list of event types as shown in FIG. 6D for the user to select one of them. In this example, the list includes "Movie", "Sports", "Concert", and "Others" although other types of events and combinations will be also possible. The display also includes the type of information "Local Events" and the city name "Barstow" selected by the user in the foregoing process.

Figure 6E:
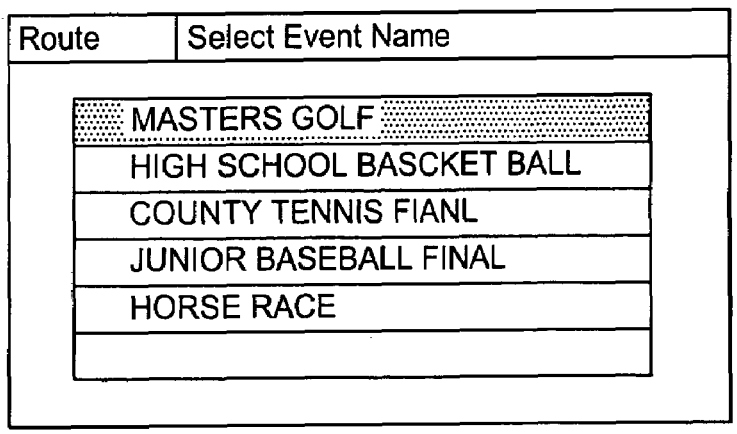
Figure 6F:
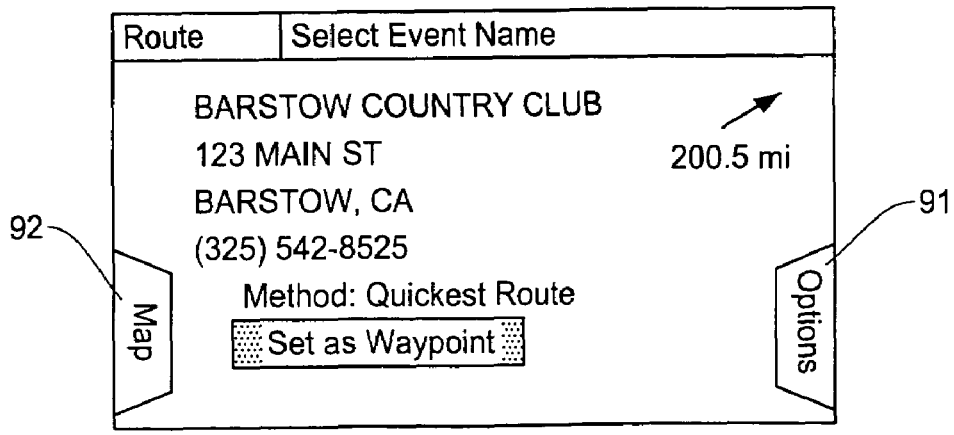

Suppose the user selects "Sports" in FIG. 6D, the navigation system displays a list of sports events as shown in FIG. 6E for the user to select one of them. The sports events in the list are limited within the city of Barstow within the search range along the route to the destination. Suppose the user selects one of the events "Masters Golf", the navigation system will display more detailed information on the selected events as shown in FIG. 6F. The detailed information includes a name, address, phone number of the golf course, start time of events, etc.

If the user wants to stop by this particular sports event "Masters Golf", he presses a "Set as Waypoint" key, and the navigation system will calculate a route and guide the user to the location of the golf tournament as a tentative destination (waypoint). The display example of FIG. 6F further includes an "Options" key 91 and a "Map" key 92. The "Options" key 91 allows the user to check time schedules, vacancies, and admission fees of the event, purchase a ticket for the event, or make a reservation, etc. The "Map" key 92 allows the user to see a map in the vicinity of the location where the selected event is or will be taken place.

Figure 7A:
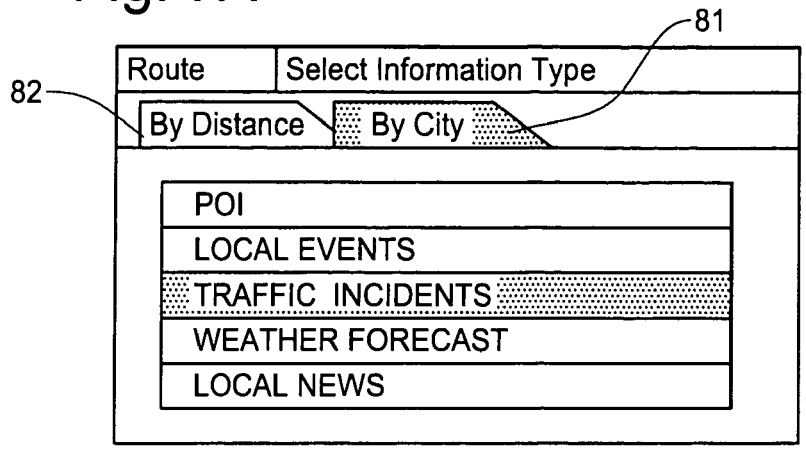

FIGS. 7A-7F are display examples showing the process of searching and displaying traffic incidents along the route in the present invention wherein the user selects a city to search traffic incidents information within the selected city. FIGS. 7A-7F are directed to the process after the user selects the "City Along Route" menu in FIG. 6A and a particular city "Barstow" in FIG. 6B. FIG. 7A corresponds to the display example of FIG. 6C and shows a of list of types of information obtainable through the navigation system. The display example of FIG. 7A includes a "By City" key 81 and a "By Distance" key 82. The "By City" key 81 allows the user to change the city by going back to the display example of FIG. 6B. The "By Distance" key 82 is to search and list the traffic incidents along the route in the order of distance from the current user position without limiting to a particular city.

Figure 7B:
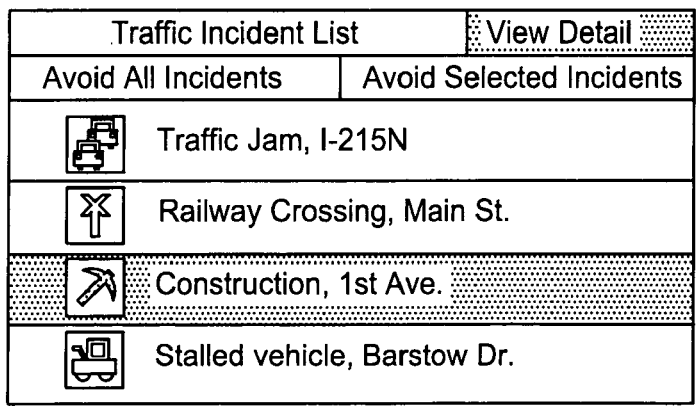

In FIG. 7A, the user selects the type "Traffic Incidents" to see the traffic incidents information along the route within the city "Barstow". The navigation system displays a list of traffic incidents as shown in FIG. 7B for the user to select one or more of them. Typically, each traffic incident information includes a traffic incident icon, type of traffic incident, and a rough location of the incident. Such traffic incidents information can be retrieved from a service provider through a wireless communication including satellite radio, FM radio, etc.

The display example of FIG. 7B includes a "View Detail" key, an "Avoid All Incidents" key, and an "Avoid Selected Incidents" key. The "View Detail" key allows the user to obtain more detailed information on the selected traffic incident. The "Avoid All Incidents" key is to instruct the navigation system to find a new route that can avoid all of the listed traffic incidents during the trip to the destination. The "Avoid Selected Incidents" key is to instruct the navigation system to find a new route that can avoid the selected traffic incidents from the new route to the destination.

Figure 7C:
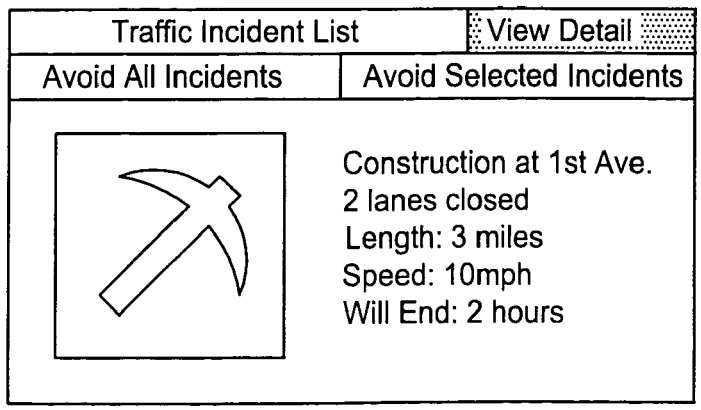

Suppose the user selects the "View Detail" key in FIG. 7B, the navigation system displays the detailed information on the selected traffic incident as shown in FIG. 7C. The detailed information includes a particular situation of incident such as "two lanes closed", a "traffic length" affected by the incident, a "speed" of the traffic, an expected time length to return to normal ("will end"), etc. The detailed information may also include an image or live video of the selected traffic incident.

FIG. 7D shows a case where the user selects particular traffic incidents and presses the "Avoid Selected Incidents" key on the display to instruct the navigation system to find a new route that can avoid the selected traffic incidents. FIG. 7E shows a case where the user presses the "Avoid Selected Incidents" key on the display to instruct the navigation to find a new route that can avoid all of the traffic incidents in the list. Thus, as shown in FIG. 7F, the navigation system recalculates and creates a new route to the destination so that the new route is not affected by all or the selected traffic incidents in the selected city.

Figure 8:
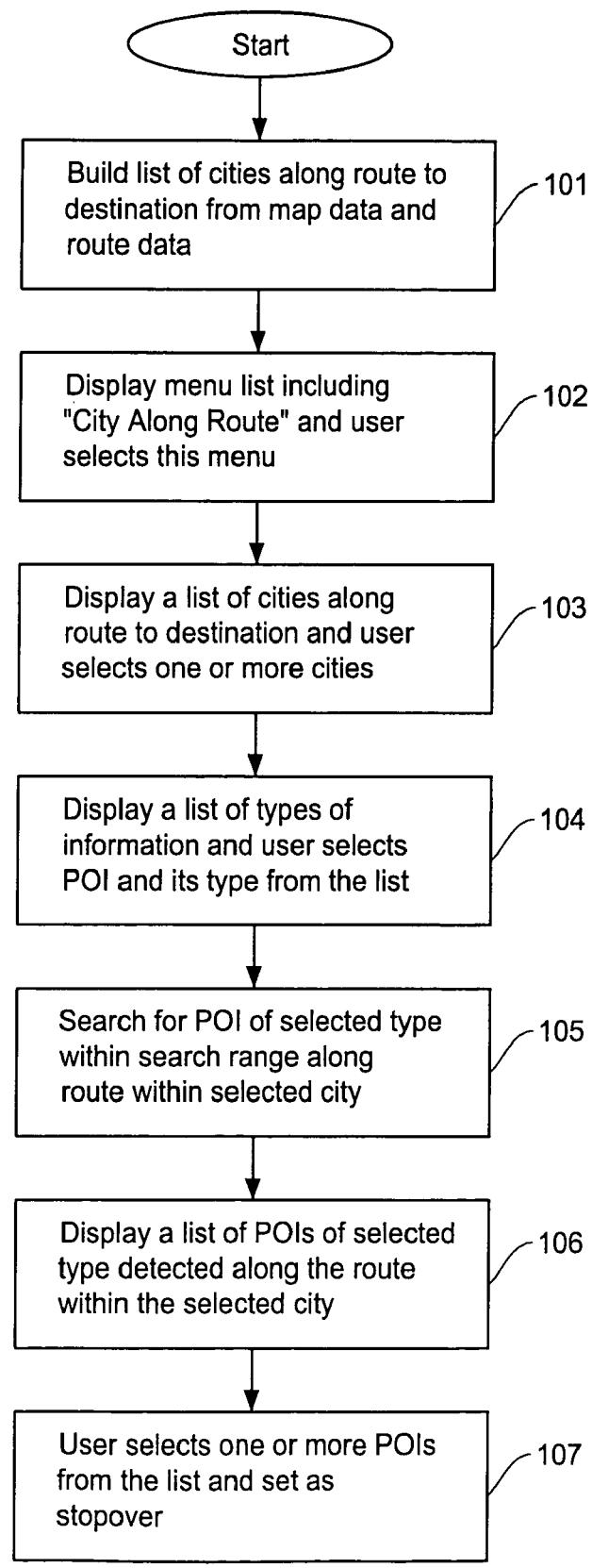
FIG. 8 is a flow chart showing an example of overall process implementing the present invention for searching and displaying POIs along the route to the destination within a specified city.

FIG. 8 is a flow chart summarizing an overall process of the present invention for searching and displaying POIs along the route to the destination within a specified city. At step 101, a list of cities along a calculated route is built based on the destination specified by the user and a route to the destination calculated by the navigation system. Such information can be retrieved from the map data in the map storage medium (DVD) of the navigation system. In the case where the user has visited the same destination before, the navigation system stores the routing data to such previous destinations in the routing data memory 42 so that the information regarding the route to the destination including the list of cities can be retrieved from the routing data memory 42 rather than from the map storage medium (DVD) 31.

The process moves to a step 102 where the navigation system displays a list of menu for the user to select one of them as shown in FIG. 6A. The list includes the "City Along Route" menu to execute the information search process of the present invention. It is assumed that the user selects the "City Along Route" menu from the list. In step 103, the navigation system displays a list of zones (cities, counties, states, etc.) on the route to the destination as shown in FIGS. 5C-5D and the user selects one or more cities from the list. Then, the process moves to a step 104 and displays a list of types of information as shown in FIG. 6C or FIG. 7A and the user selects the information type "POI" from the list. In response, the navigation system displays a list of types of POI as shown in FIG. 5E for the user to select one of them.

At step 5, the navigation system searches and retrieves the POI information of selected type within in the search range along the route within the selected city. Then, at step 106, the navigation system displays a list of POIs of selected type within the selected city as shown in FIG. 5G. The user selects one or more POIs that he wants to go from the list and sets the POI as a stopover. Consequently, the navigation system determines a route to the selected POI and guides the user to the selected POI as a waypoint during the trip to the destination.

Figure 9:
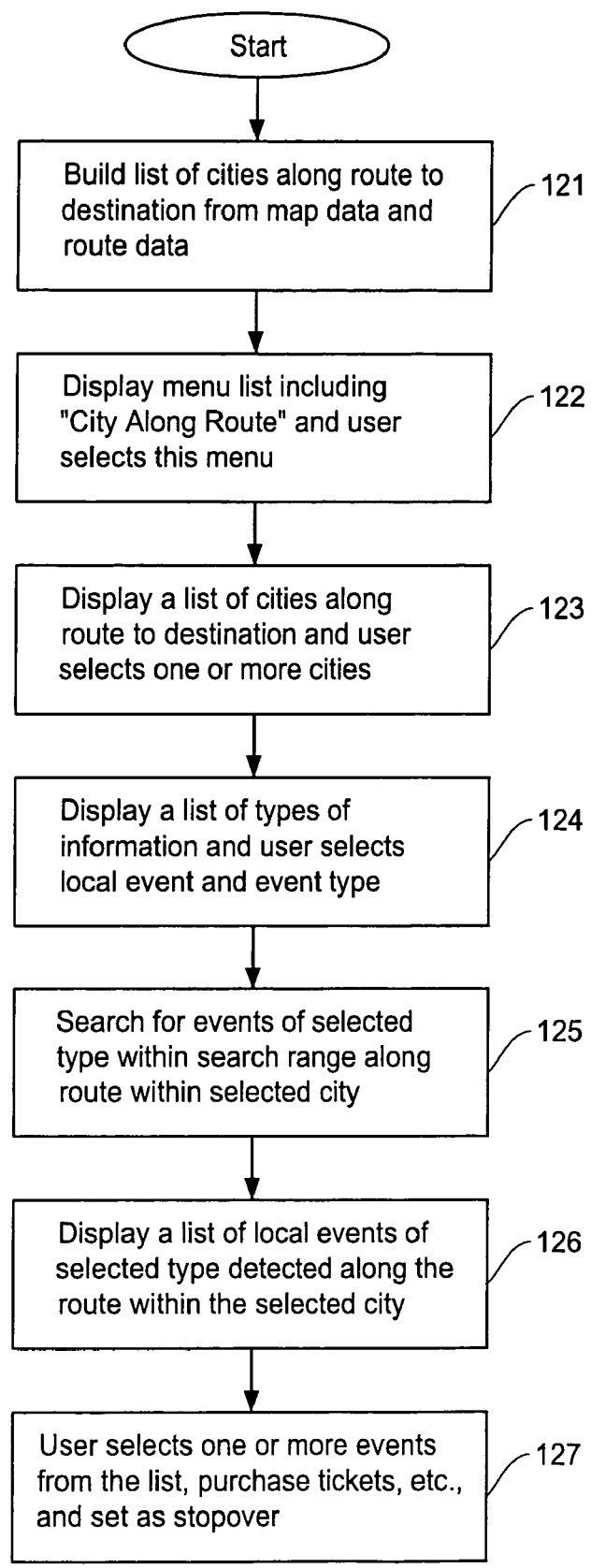
FIG. 9 is a flow chart showing an example of overall process implementing the present invention for searching and displaying local events along the route to the destination within a specified city.

FIG. 9 is a flow chart summarizing an overall process of the present invention for searching and displaying local events along the route to the destination within a specified city. At step 121, a list of cities along a calculated route is built based on the destination specified by the user and a route to the destination calculated by the navigation system. Such information can be retrieved from the map data in the map storage medium (DVD) of the navigation system. In the case where the user has visited the same destination before, the navigation system stores the routing data to such previous destinations in the routing data memory 42 so that the information regarding the route to the destination including the list of cities can be retrieved from the routing data memory 42 rather than from the map storage medium (DVD) 31.

The process moves to a step 122 where the navigation system displays a list of menu for the user to select one of them as shown in FIG. 6A. The list includes the "City Along Route" menu to execute the information search process of the present invention. It is assumed that the user selects the "City Along Route" menu from the list. In step 123, the navigation system displays a list of zones (cities, counties, states, etc.) on the route to the destination as shown in FIG. 6B and the user selects one or more cities from the list. Then, the process moves to a step 124 and displays a list of types of information as shown in FIG. 6C. The user selects the information type "Local Events" from the list. In response, the navigation system displays a list of types of local events as shown in FIG. 6D for the user to select one of them. The user selects a particular event type such as "sports" from the list in FIG. 6D.

The navigation system searches and retrieves the local event information of selected type along the route within the selected city in step 125. Then, at step 126, the navigation system displays a list of local events of selected type "sports" within the selected city as shown in FIG. 6E. In step 127, the user selects one or more local events to see more details of the event. If the user wants to see the actual event, the user purchases a ticket and sets the event as a stopover. Consequently, the navigation system determines a route to the location of the selected event and guides the user to the selected local event as a waypoint during the trip to the destination.

Figure 10:
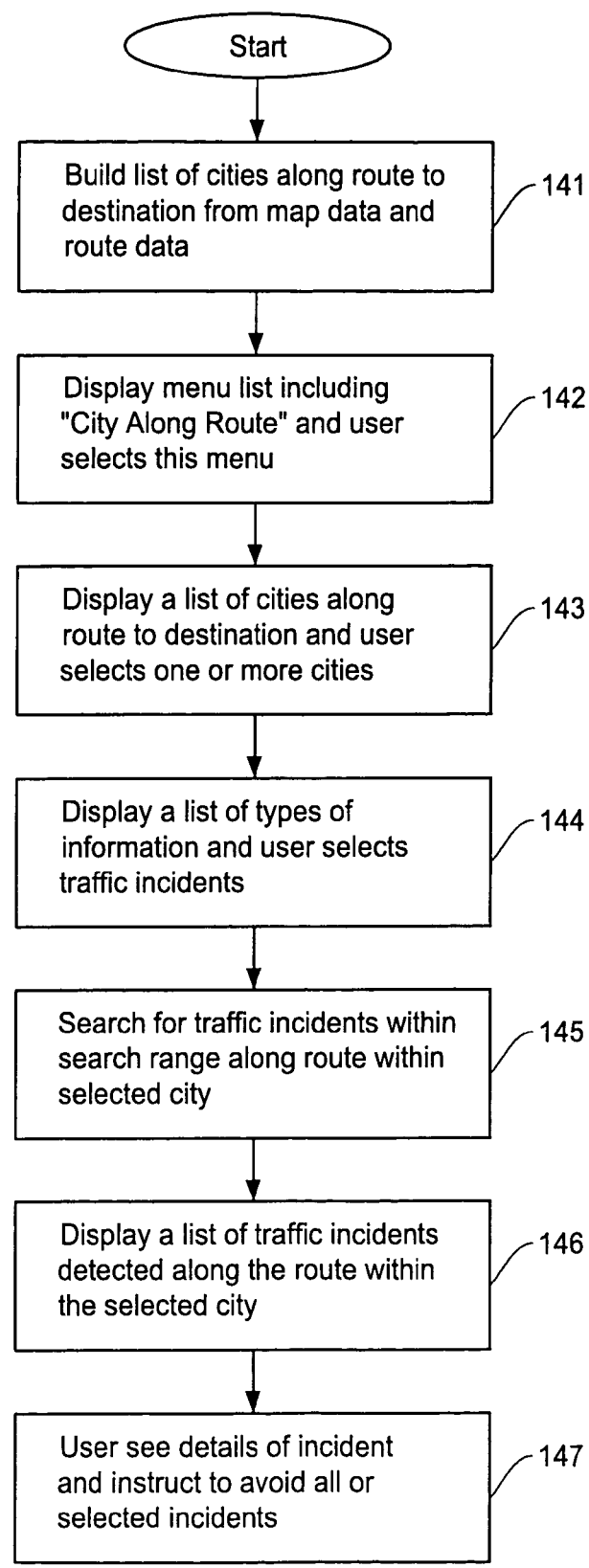
FIG. 10 is a flow chart showing an example of overall process implementing the present invention for searching and displaying traffic incidents along the route to the destination within a specified city.

FIG. 10 is a flow chart summarizing an overall process of the present invention for searching and displaying traffic incidents along the route to the destination within a specified city. At step 141, a list of cities along a calculated route is built based on the destination specified by the user and a route to the destination calculated by the navigation system. Such information can be retrieved from the map data in the map storage medium (DVD) of the navigation system. In the case where the user has visited the same destination before, the navigation system stores the routing data to such previous destinations in the routing data memory 42 so that the information regarding the route to the destination including the list of cities can be retrieved from the routing data memory 42 rather than from the map storage medium (DVD) 31.

The process moves to a step 142 where the navigation system displays a list of menu for the user to select one of them as shown in FIG. 6A. The list includes the "City Along Route" menu to execute the information search process of the present invention. It is assumed that the user selects the "City Along Route" menu from the list. In step 143, the navigation system displays a list of zones (cities, counties, states, etc.) on the route to the destination as shown in FIG. 6B and the user selects one or more cities from the list. Then, the process moves to a step 144 and displays a list of types of information as shown in FIG. 7A and the user selects the information type "Traffic Incidents" from the list. The navigation system searches and retrieves the traffic incidents information along the route within the selected city in step 145.

Then, at step 146, the navigation system displays a list of traffic incidents along the route within the selected city as shown in FIG. 7B. In step 147, the user selects one or more traffic incidents to see more details of the incident as shown in FIG. 7C, and if he wants to avoid all or selected traffic incident, the user specifies the traffic incident to avoid. Consequently, the navigation system determines a new route that can avoid all or selected traffic incidents in the specified city during the trip to the destination.

Figure 11:
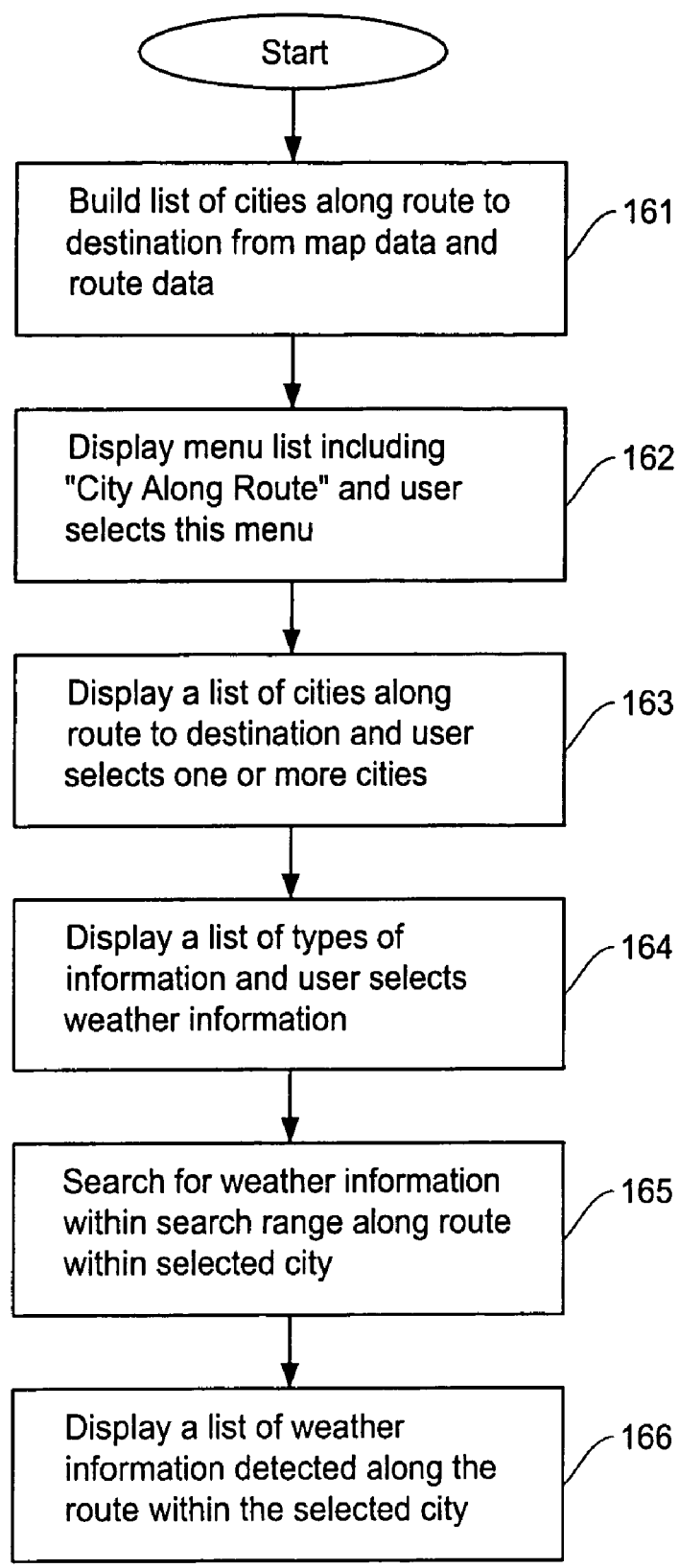
FIG. 11 is a flow chart showing an example of overall process implementing the present invention for searching and displaying weather information along the route to the destination within a specified city.

FIG. 11 is a flow chart summarizing an overall process of the present invention for searching and displaying weather information along the route to the destination within a specified city. At step 161, a list of cities along a calculated route is built based on the destination specified by the user and a route to the destination calculated by the navigation system. Such information can be retrieved from the map data in the map storage medium (DVD) of the navigation system. In the case where the user has visited the same destination before, the navigation system stores the routing data to such previous destinations in the routing data memory 42 so that the information regarding the route to the destination including the list of cities can be retrieved from the routing data memory 42 rather than from the map storage medium (DVD) 31.

The process moves to a step 162 where the navigation system displays a list of menu for the user to select one of them as shown in FIG. 6A. The list includes the "City Along Route" menu to execute the information search process of the present invention. It is assumed that the user selects the "City Along Route" menu from the list. In step 163, the navigation system displays a list of zones (cities, counties, states, etc.) on the route to the destination as shown in FIG. 6B and the user selects one or more cities from the list.

Then, the process moves to a step 164 and displays a list of types of information as shown in FIG. 7A and the user selects the information type "Weather Forecast" from the list. The navigation system searches and retrieves the weather information along the route within the selected city in step 165. Then, at step 166, the navigation system displays the retrieved weather information along the route within the selected city. Consequently, the user is able to know the weather condition of the specified city during the trip to the destination.

Although the above embodiments classify the regional zones on the route to the destination by cities, other regional distinction can also be made. For example, the navigation system may allow the user to search POIs or other information along the route by a unit of neighborhood areas, county, or state through which the vehicle will pass. This is advantageous for a long trip as it allows the user to easily obtain desired information for a distant area. For example, the user may wish to shop in the state where the state sales tax rate is low. Moreover, in the preferred embodiments described above, the user first selects a city and then a category of POIs or a type of information to be searched. However, in the alternative, the navigation system may also prompt the user to select the type of information first and then the city name.

As has been described above, the method and apparatus of the present invention enables to search POIs or other type of information along the route to the destination within a selected region such as a city. The user can plan ahead to decide a stopover location even when such a location is far away at present. Accordingly, the flexibility and usability of the navigation system are greatly increased by enhancing the ability in which the search along the route method is used.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of finding information along a calculated route to a destination with use of a navigation system, comprising the following steps of:

building one or more zones to be traversed in travelling on the calculated route to the destination based on map data;

displaying a list of zones on the calculated route to prompt a user to select a zone;

displaying a list of types of information to prompt the user to select a type of information to be searched;

searching information along the calculated route within the selected zone within a predetermined search range of the calculated route; and displaying the information of the selected type within the selected zone resulted from the search;

wherein said zones are cities through which the calculated route runs and the user selects one or more cities from the list of zones, and the cities are arranged in the order of the distance from a current vehicle position along the route; and wherein said step of displaying the list of types of information includes a step of displaying both a distance key and a city key on a screen at the same time to prompt the user to select a range or searching the type or information either by the range of a city along the calculated route or a distance from the current vehicle position.

2. A method of finding information as defined in claim 1, wherein said zone further includes a county or state through which the calculated route runs.

3. A method of finding information as defined in claim 1, wherein said information is points of interest (POI) information along the calculated route, and the method further comprising a step of displaying a list of types of POI information to prompt the user to select a type of POIs to be searched.

4. A method of finding information as defined in claim 1, wherein said information is points of interest (POI) information along the calculated route, and the method further comprising a step of setting a selected POI as a stopover so that the navigation system guides the user to the selected POI en route to the destination.

5. A method of finding information as defined in claim 1, wherein said information is local event information along the calculated route, and the method further comprising a step of displaying a list of types of local event information to prompt the user to select a type of local events to be searched.

6. A method of finding information as defined in claim 1, wherein said information is local event information along the calculated route, and the method further comprising a step of setting a place of selected local event as a stopover so that the navigation system guides the user to the selected local event en route to the destination.

7. A method of finding information as defined in claim 1, wherein said information is local event information along the calculated route, and the method further comprising a step of displaying detailed information on a selected local event and allowing the user to make a reservation or purchase a ticket for the selected local event.

8. A method of finding information as defined in claim 1, wherein said information is traffic incident information along the calculated route, and the method further comprising a step of displaying a list of traffic incidents with corresponding traffic icons.

9. A method of finding information as defined in claim 1, wherein said information is traffic incident information along the calculated route, and the method further comprising a step of specifying all or selected traffic incidents to avoid from the calculated route to the destination.

10. A method of finding information as defined in claim 9, further comprising a step of recalculating a route to the destination to produce a new route which avoids all or the selected traffic incidents therefrom.

11. An apparatus for finding information along a calculated route to a destination with use of a navigation system, comprising:

means for building one or more zones to be traversed in travelling on the calculated route to the destination based on map data and routing data;

means for displaying a list of zones on the calculated route to prompt a user to select a zone;

means for displaying a list of types of information to prompt the user to select a type of information to be searched;

means for searching information along the calculated route within the selected zone within a predetermined search range of the calculated route; and means for displaying the information of the selected type within the selected zone resulted from the search;

wherein said zones are cities through which the calculated route runs and the user selects one or more cities from the list of zones, and the cities are arranged in the order of the distance from a current vehicle position along the route; and wherein said means for displaying the list of types of information includes means for displaying both a distance key and a city key on a screen at the same time to prompt the user to select a range of searching the type of information either by the range of a city along the calculated route or a distance from the current vehicle position.

12. An apparatus for finding information as defined in claim 11, wherein said zone further includes a county or state through which the calculated route runs.

13. An apparatus for finding information as defined in claim 11, wherein said information is points of interest (POI) information along the calculated route, and the apparatus further comprising means for displaying a list of types of POI information to prompt the user to select a type of POIs to be searched.

14. An apparatus for finding information as defined in claim 11, wherein said information is points of interest (POI) information along the calculated route, and the apparatus further comprising means for setting a selected POI as a stopover so that the navigation system guides the user to the selected POI en route to the destination.

15. An apparatus for finding information as defined in claim 11, wherein said information is local event information along the calculated route, and the apparatus further comprising means for displaying a list of types of local event information to prompt the user to select a type of local events to be searched.

16. An apparatus for finding information as defined in claim 11, wherein said information is local event information along the calculated route, and the apparatus further comprising means for setting a place of selected local event as a stopover so that the navigation system guides the user to the selected local event en route to the destination.

17. An apparatus for finding information as defined in claim 11, wherein said information is local event information along the calculated route, and the apparatus further comprising means for displaying detailed information on a selected local event and allowing the user to make a reservation or purchase a ticket for the selected local event.

18. An apparatus for finding information as defined in claim 11, wherein said information is traffic incident information along the calculated route, and the apparatus further comprising means for displaying a list of traffic incidents with corresponding traffic icons.

19. An apparatus for finding information as defined in claim 11, wherein said information is traffic incident information along the calculated route, and the apparatus further comprising means for specifying all or selected traffic incidents to avoid from the calculated route to the destination.

20. An apparatus for finding information as defined in claim 19, further comprising means for recalculating a route to the destination to produce a new route which avoids all or the selected traffic incidents therefrom.

* * * * *